United States Patent [19]
Blick

[11] Patent Number: 5,562,276
[45] Date of Patent: Oct. 8, 1996

[54] LOCATOR AND HOLD DOWN SYSTEM FOR A MACHINE

[76] Inventor: John Blick, 31891 Circle Dr., S. Laguna, Calif. 92677

[21] Appl. No.: 306,162

[22] Filed: Sep. 14, 1994

[51] Int. Cl.⁶ ........................................ B23Q 3/10
[52] U.S. Cl. .................. 269/20; 269/21; 269/309
[58] Field of Search .................... 269/309, 310, 269/20, 21; 248/362, 363; 279/3; 451/412, 388

[56] References Cited

U.S. PATENT DOCUMENTS

| | | | |
|---|---|---|---|
| 3,520,055 | 7/1970 | Jannett | 269/21 |
| 3,537,701 | 11/1970 | Claycomb | 269/309 |
| 3,729,185 | 4/1973 | Roeske | 269/310 |
| 3,907,268 | 9/1975 | Hale | 269/21 |
| 4,934,672 | 6/1990 | Craft | 269/310 |
| 5,203,547 | 4/1993 | Marumo | 269/21 |

FOREIGN PATENT DOCUMENTS 1636175  3/1991  U.S.S.R. ................. 269/20

*Primary Examiner*—Robert C. Watson
*Attorney, Agent, or Firm*—Curtis L. Harrington

[57] ABSTRACT

The devices and systems of the present invention encompasses both an apparatus and method enabling quick repositioning of positional devices, and quick positioning of supports, particularly useful in edging and milling applications. The positional device uses a set of nested pistons which are mounted in an offset fashion onto a circular vacuum platform. The platform has a push tubing connection which is amenable to manual evacuation onto the working table, and a manual pressure release to facilitate spot movement of individual positional devices. An auxiliary vacuum system enables the positional devices in each work area to be individually controlled.

The quick positioning of supports is accomplished through the use of a "spider" shaped hub which is connected to the supports using a set of approximately equal lengths of pressure tubing. Since the vast majority of shapes which are processed have a center of mass at a given point, the use of the hub even where only a portion of the periphery supports are equidistant from the hub will still result in a savings in tangled lines and in the total number of line going onto the table. Further, this "spider" or hub arrangement assists the operator in that it encourages setup using a center member and its surrounding members, and thus saves setup time. Therefore, to an extent, it tends to keep a surround orientation as it is moved about the work table, to quickly locate the work area.

9 Claims, 5 Drawing Sheets

LOCATOR AND HOLD DOWN SYSTEM FOR A MACHINE

FIELD OF THE INVENTION

The present invention relates to the field of holding devices for machines. More specifically, the present invention relates to a pneumatic system, which may piggy-back onto but is different from existing pneumatic systems relating to holding down a work piece, and includes a pneumatic hold-down for a positional device.

BACKGROUND OF THE INVENTION

In many instances, it is necessary to locate a position indicating structure with respect to a work piece which is to be milled, sanded, ground, etc. The precision and stability of the positional device is important, as is the ability to re-position the positional device.

Currently, in the glass grinding industry, a variety of edge configurations are available. These complex shapes are ground by a router-type spindle which travels around a work piece.

In current practice, a generally flat surface defining a multiplicity of parallel ribs is provided. This ribbed table is used to support a series of supports which hold, for example, a planar sheet of glass in a horizontal orientation and at an elevation over the table of about four to eight inches high. The sheets of glass are usually held onto the plurality of supports by a vacuum system which incorporates safety into its operation. Once the glass is locked down onto the supports, it will not release until the grinding spindle is shut down, and or until the motion control structure which carries the grinding motor and its grinding spindle is moved off to one side.

Since the spindle grinds from its edge, the tip of the spindle is fittable with a pin or other slender structure which can be used as a locating pin. Usually the operator will, at the beginning of work on a run of similar types of glass, locate several positional devices as dictated by the operational software of the machine. Once the machinery is apprised of where the work piece is to be located, it will positionally specify the location of positional devices, which are pneumatic piston devices which have spacers against which subsequently loaded glass work pieces will be placed.

These positional devices can be positioned using an angled device against which the spacers of the positional devices may be positioned. This is a somewhat automatic step with the machine dictating the locations and the operator responding by moving positional devices as indicated by the machine. The angled block located by the machine may be picked up from a tool bin containing other tools, and replaced once the position of the positional devices is fixed by the operator. The operator moves each positional device into place, and the control causes the angled block to move to the next location in a manner which will not bump against the positional device. In fact, using conventional positional devices, the operator will typically tighten the positional device down at the time of locating it. These locating devices use the ribs in the work table to extend through a locking bar, turn the bar perpendicular to the slotted opening, and using a screw or threaded rod lock the locating device onto the table in a position adjacent the glass work piece.

Usually this locational exercise is repeated about two or more times to make sure that the edges of the glass work piece will be properly guided into place once a run of a particular type of shaping is to occur. By using the relationship of two or more positional devices, the person loading in each new piece of glass to be processed can do it consistently.

Once the positional devices, with pistons extended upwardly are used to guide the loading of the glass onto the supports, the pistons and spacers are brought downwardly out of the way to make way for the grinding spindle to do its work. Thus the positional devices are only used for an instant, but have to be exactly located at the beginning of each run, that is at the start of a particular process performed on a particular size of glass. Each time a different setup is required, which corresponds to a different size work piece or a different application, the positional devices must be manually unlocked, the computer must use a moveable member to locate new positions, and the positional devices must be re-locked into position.

The problem with the conventional system, as outlined above, is in the time required for the operator to change the positional devices. For each new work setup, the operator must manually operate the positional devices to unlock them from their fixed position. This requires the operator to crawl or squat on or bend over the work table long enough to engage the threaded holding member, usually a bolt or threaded rod, with a hex wrench or other wrench. This is extremely time consuming, dangerous and injurious to employees. Further, the times when the machine is down for changing the position of the positional device, represents a significant cost, in accord with the saying "if the spindle isn't turning, you aren't earning."

There is the further limitation which the slotted table represents to locating the positional device at particular points with regard to the work piece. Although the positional device may be turned somewhat about the axis of the threaded rod by which it is anchored to a the slotted table, its position is limited by the location of the slots. In some shapes, it is important for the computer to specifically locate the mounted positional device, to make sure that it will be in place to bear against the next piece of glass loaded onto the machine. A system which relies on a fixed slot may not always be able to meet this goal.

Another problem encountered involves the need for a separate vacuum line which is controllable, and in addition to the vacuum lines which operate the glass supports. The supports should be easily moveable, either one at a time or as a group.

Another problem deals with the location and positioning of pressure lines onto the table. A work setup which requires 10 supports will require at least 20 separate lines going onto the table, in addition to the lines for the positional device. This can make quite a mess and is dangerous for the following reasons. The pressure lines are somewhat stiff and can "bow" upwardly and get in the way of the routing or edging tool. This would cause the line to be cut and could upset the work area. More importantly, the tangle of lines makes it much more difficult and time consuming to change the setup.

Any device or system which could reduce the number of lines would be of great help and savings. Any device which would reduce the set up time for locating the positional devices would similarly result in an improved system and significant cost savings.

SUMMARY OF THE INVENTION

The devices and systems of the present invention encompasses both an apparatus and method enabling quick repositioning of positional devices, and quick positioning of supports, particularly useful in edging and milling applications.

The positional device uses a set of nested pistons which are mounted in an offset fashion onto a circular vacuum platform. The platform has a push tubing connection which is amenable to manual evacuation onto the working table, and a manual pressure release to facilitate spot movement of individual positional devices. An auxiliary vacuum system enables the positional devices in each work area to be individually controlled.

The quick positioning of supports is accomplished through the use of a "spider" shaped hub which is connected to the supports using a set of approximately equal lengths of pressure tubing. Since the vast majority of shapes which are processed are round, or at least have a center of mass at a given point, the use of the hub even where only a portion of the periphery supports are equidistant from the hub will still result in a savings in tangled lines and in the total number of lines going onto the table. Further, this "spider" or hub arrangement assists the operator in that it encourages setup using a center member and its surrounding members. Therefore, to an extent, it tends to keep a surround orientation as it is moved about the work table.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
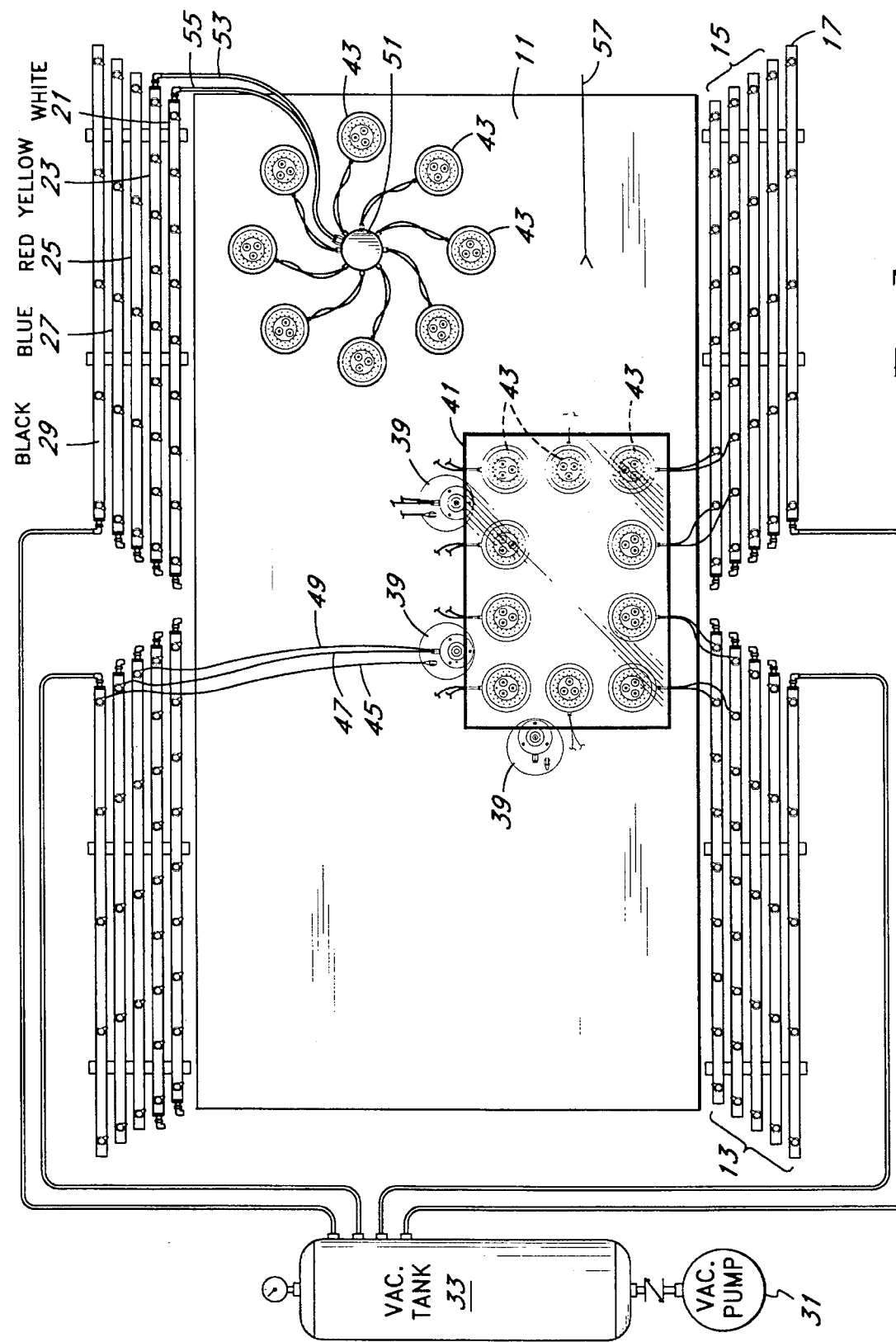
FIG. 1 is a semi schematic top view of a work table for processing glass items and illustrating the vacuum system, the positional devices and the hub of the present invention.

The description and operation of the invention will be best described with reference to FIG. 1. FIG. 1 is a view looking down onto a work table for a machine which performs milling and routing of glass sheets. The vacuum system is shown somewhat schematically. A table 11 is surrounded on both of its elongate sides with a vacuum system. The vacuum system contains groups of headers 13 and includes conventional headers 15 and a new header 17. The header 17 is for the purpose of operating the positional devices of the present invention. The headers are typically color coded based upon their purpose and the pattern on both sides of the table 11. Closest to the table is white 21, followed by yellow 23, red 25, blue 27 and black 29.

To the left of the table 11 is shown a vacuum pump 31, which is connected to an independent vacuum storage tank 33. The independent vacuum storage tank 33 is connected to the headers white 21, yellow 23, red 25, and blue 27 by connections not shown in FIG. 1. In addition to suction, the white 21 header also possesses the ability to send a puff of air to not only re-establish the non-vacuum pressure, but to also positively break any adhesion remaining between the support structures and the glass, once the processing is completed.

Lines are shown which connect the independent vacuum to the black 29 headers to emphasize the operation thereof. Near the center of the table is shown a set of three positional devices 39, and located with respect to a square shape which is a piece of glass 41. The glass 41 is a horizontally located plate and is shown supported by a series of supports 43. As can be seen, the positional devices 39 of the present invention appear as one set of circular structures mounted to one side of an overall circular structure. This will be shown in greater detail in subsequent drawings.

The positional device of the present invention is connected to a series of three lines which extend from their associated header. A black line is attached to the positional device 39 to hold it down onto the table 11. A red line 47 and a blue line 49 is also connected to the positional device 39. The other positional devices shown in FIG. 1 are similarly connected, but such connections are not shown for simplicity sake.

A set of supports 43 are shown in FIG. 1 surrounding a hub 51. The hub connector 51 has a yellow line 53 connected to the yellow 23 header and a white line 55 connected to the white 21 header. As will be seen, the hub connector 51 is held down to the table 11 in the same manner as the supports 43 which it serves, and the same line which supplies vacuum to hold down the supports 43 also provides the hold down vacuum for hub connector 51. As can be seen the hub connector 51 forms a hub for the supports 43 which appear about the hub connector 51 in a spoke-like fashion.

Also note the presence of a tool 57 which can be used to assist the operator in moving objects about on the table 11, including both the positional devices 39 and supports 43. This device has a curved and an angled end, adjacent each other, to assist in pulling and pushing the positional devices 39 and supports 43 away from and toward the operator. The use of this device will enhance the safety and speed with which a new run may be set up.

Figure 2:
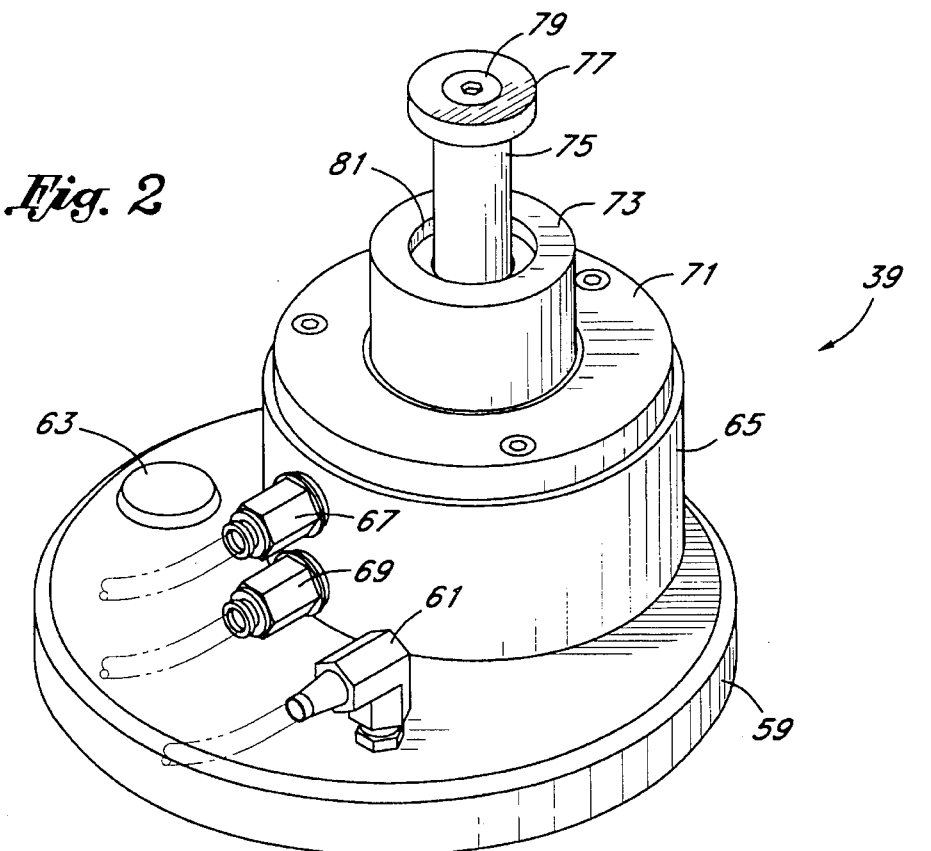
FIG. 2 is a perspective view of the positional device of the present invention.

Referring to FIG. 2 a perspective and expanded view of the positional device 39 is shown. Positional device 39 has a circular base 59 which supports a vacuum line connection 61. Vacuum line connection 61 is typically a 0.25 inch coupling which is intended to work with hosing which is six millimeters in diameter. The resulting difference in diameter of from about 15 to about 20 one-thousandths make it easy to remove and replace the tubing with respect to the connection 61. Since this fitting is used only with a vacuum, the loseness will not present a problem, and the tubing used will be self sealing under vacuum conditions.

However, the difference in diameter will enable an operator to engage and remove the tubing with one hand. When moving the positional device 39 about supports A pressure bleed valve 63 is located a distance from vacuum line connection 61. The preferred connection 61, as is the case with all line connections on the table 11, are push in type connectors which not only form a sealed connection, but hold the end of the tube in place. Pressing axially toward the connector with the ring while simultaneously pulling on the tube, will cause the tube to disconnect. In this manner, an operator can connect and disconnect the tubes at will, and using one hand.

A piston actuation housing 65 is mounted atop circular base 59 in a non-concentric fashion, and may be mounted as far to one edge as is practical for stability and while protecting the piston actuation housing. The piston actuation housing supports a pair of quick release connectors 67 and 69 which are shown in a vertical orientation. In the configuration of FIG. 2, the connectors are oriented in a direction to overlie the larger surface area of the circular base 59 to protect both the connectors 67 and 69 against damage in the event that the positional device 39 is dropped.

As is shown, the piston housing has a locking collar 71, from which arise a larger diameter piston 73 and a smaller diameter piston 75. The smaller diameter piston has a spacer ring 77 secured by a hex screw 79. Note the circular groove 81 about the top of larger diameter piston 73 which will accommodate the spacer ring 77 when the smaller diameter piston 75 is withdrawn into the larger diameter piston. The dimensions of the spacer ring 77 are known to the computers used to run the operations performed on table 11 so that the computers may assist in locating the positional device 39 in an exacting fashion.

The connectors 67 and 69 operate the pistons 73 and 75 to an up or down position; an up position to assist an operator in loading glass onto the supports 43 on the table 11, and to a down position, out of the way, to enable a router or milling device, or an edging device to process the glass.

Figure 3:
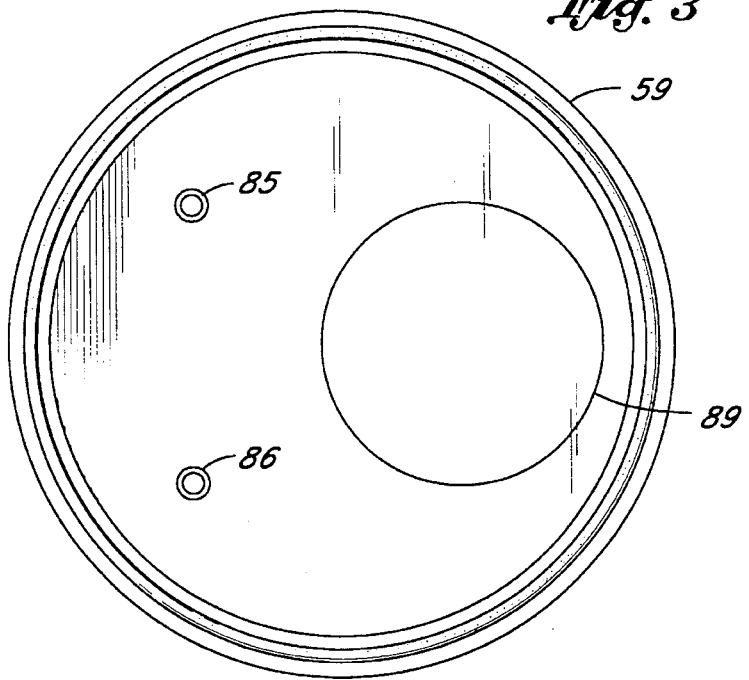
FIG. 3 is a bottom view of the positional device of the present invention and illustrating the structural aspects thereof.

Referring to FIG. 3, a bottom view of the positional device 39 reveals the details of the underside of the circular base 59. A vacuum aperture 85 is in fluid contact with the vacuum line connection 61. A vacuum aperture 86 is in fluid contact with the pressure bleed valve 63. pressure bleed valve 63 is typically of the push button type, and is used to break the vacuum beneath the positional device 39 through the vacuum aperture 86. A circular elastomeric sealing member 87 is shown extending about the bottom of circular base 59 near the outermost periphery. As a vacuum is drawn through the vacuum aperture 85, the elastomeric sealing member 87 assists in affixing the circular base 59 to the table 11. Also shown is a smaller diameter circle which is the mounting area 89 for the piston actuation housing 65, and having a small locking screw 87 to hold the piston actuation housing 65 in place with respect to the circular base 59.

Figure 4:
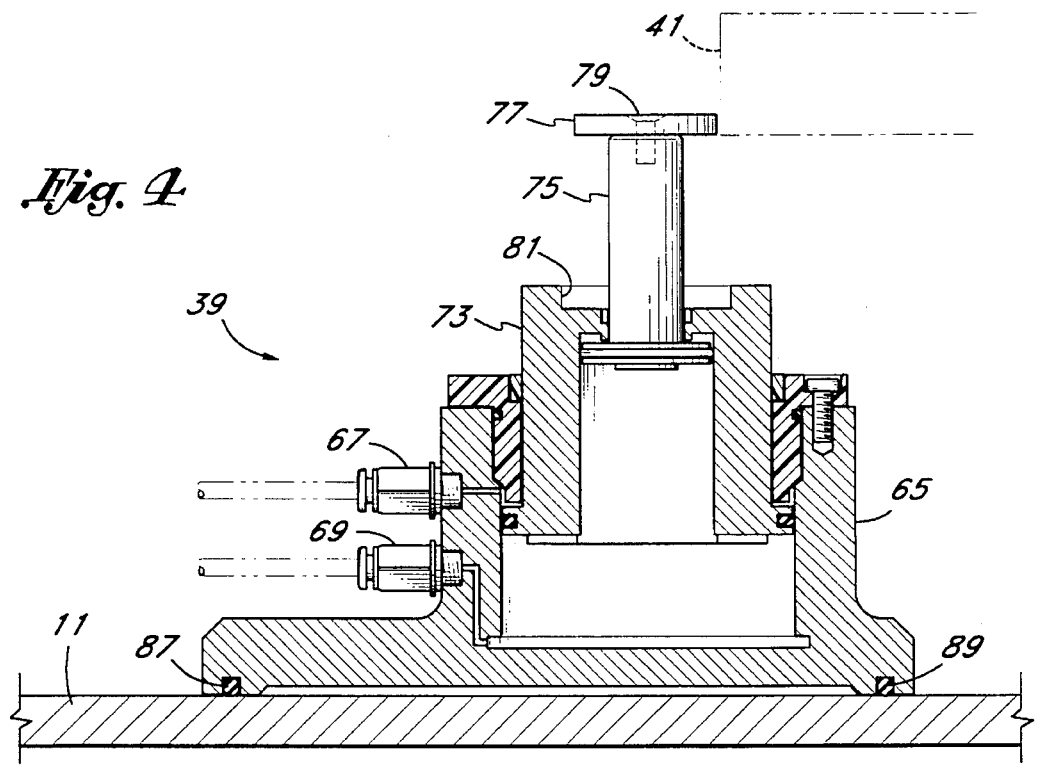
FIG. 4 is a cross-sectional view of the positional device of FIGS. 1–3 shown in extended position.
Figure 5:
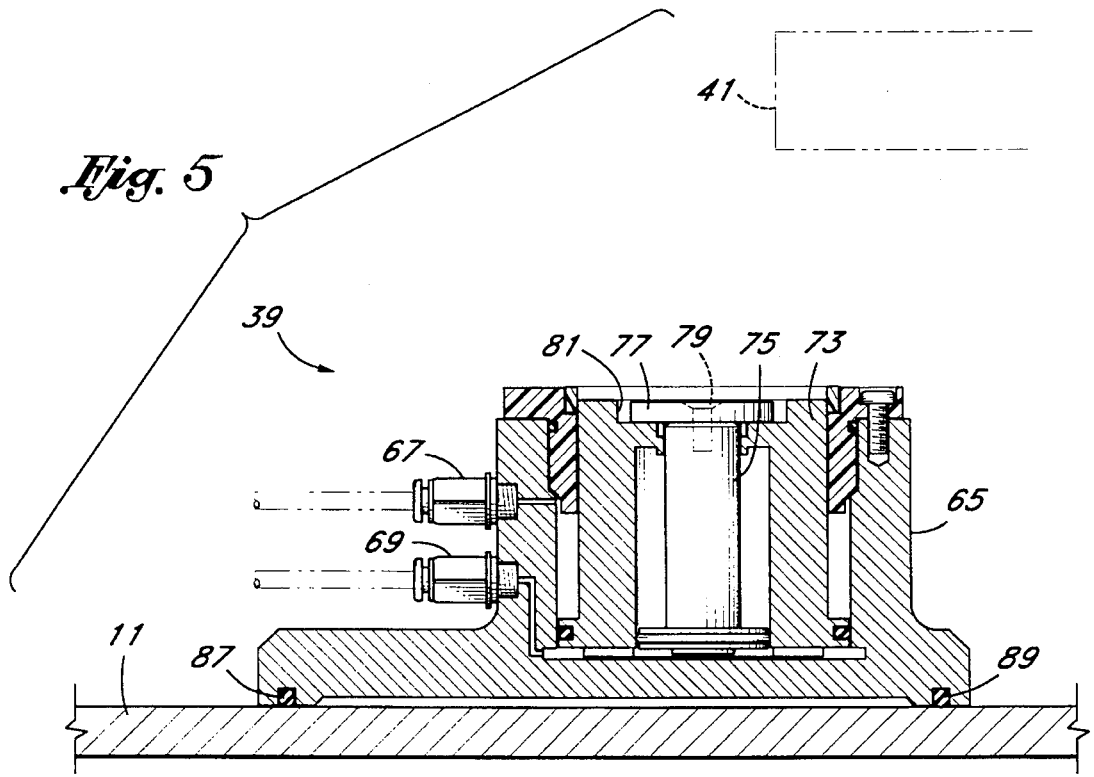
FIG. 5 is a cross sectional view of the positional device of FIGS. 1–4 shown in retracted position.

Referring to FIG. 4, a cross sectional view of the positional device 39 illustrates further detail and it is shown in a position with the pistons 73 and 75 in extended position. FIG. 5 illustrates a view similar to that of FIG. 4, but with the pistons 73 and 75 in retracted position.

Figure 6:
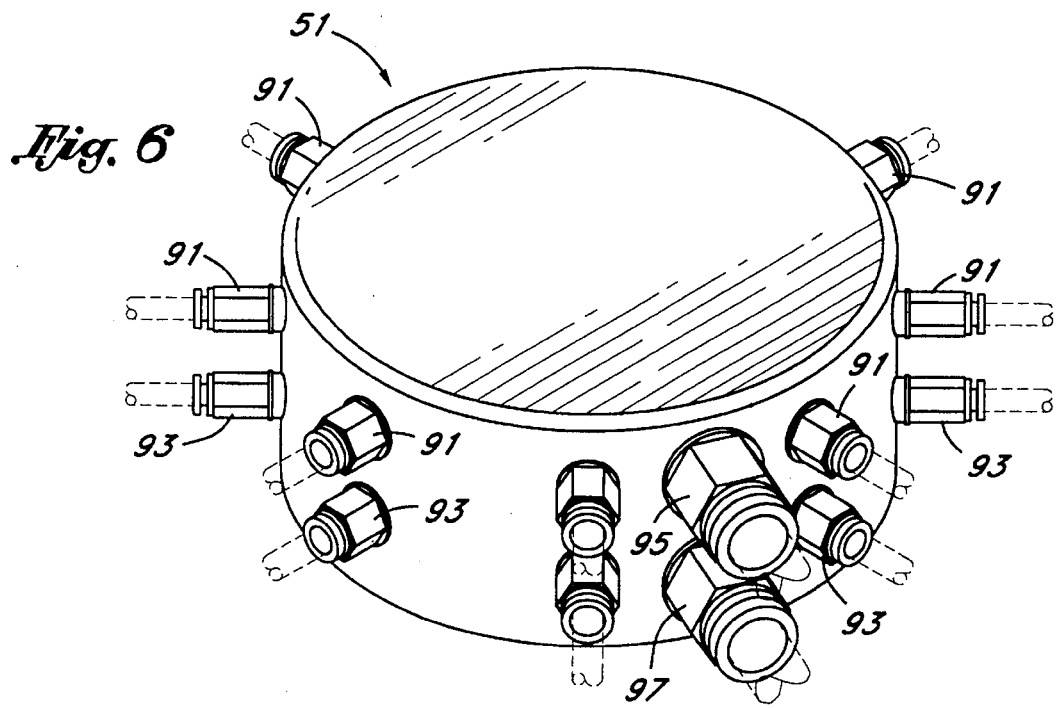
FIG. 6 is perspective view of the hub connector of the present invention.

FIG. 6 is a perspective view of the hub connector 51. The particular hub connector 51 shown has eight pairs of small connectors about its periphery, including upper connectors 91 and lower connectors 93. It is understood that hub connector 51 can have any number of connectors located either on its periphery or any surface. A single set of feed connectors, namely upper feed connector 95 and lower feed connector 97 are shown between two pairs of connectors 91, 93, and which will probably be of a larger size in order to effectively serve the smaller size fittings with which it is in fluid communication. The body of the hub connector 51 is generally cylindrically shaped.

Figure 7:
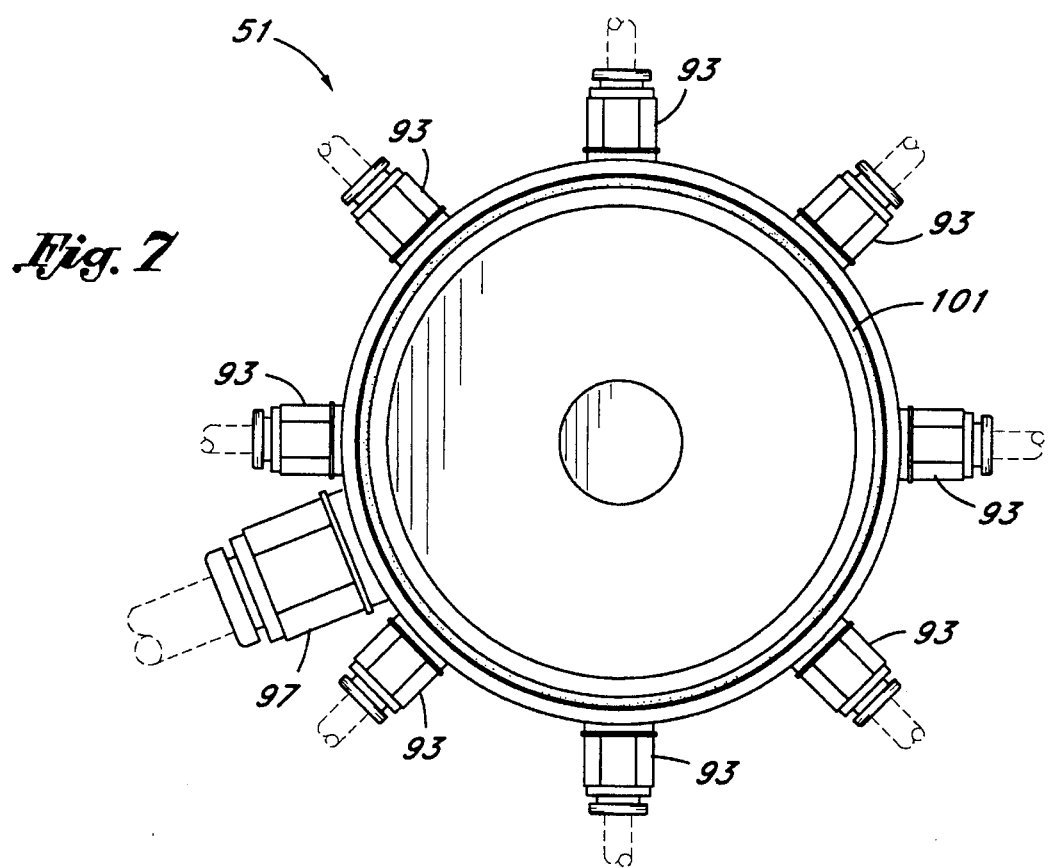
FIG. 7 is a bottom view of the hub connector of the present invention and illustrating the structural aspects thereof.

Each of the upper connectors 91 are in fluid communication with the upper feed connector 95 and with each other. Referring to FIG. 7, a bottom view of the hub connector 51 is illustrated. As shown, the hub connector 51 has a central vacuum aperture 99 which is large enough to be considered a chamber. This aperture is in communication with each of the lower connectors 91, and therefore each of the lower connectors 91 are in fluid communication with each other. As will be seen the hub connector 51 parallels the operation of the supports 43 which they serve. As is also seen, a circular elastomeric sealing member 101 is shown extending about the bottom of hub connector 51 near the outermost periphery.

Figure 8:
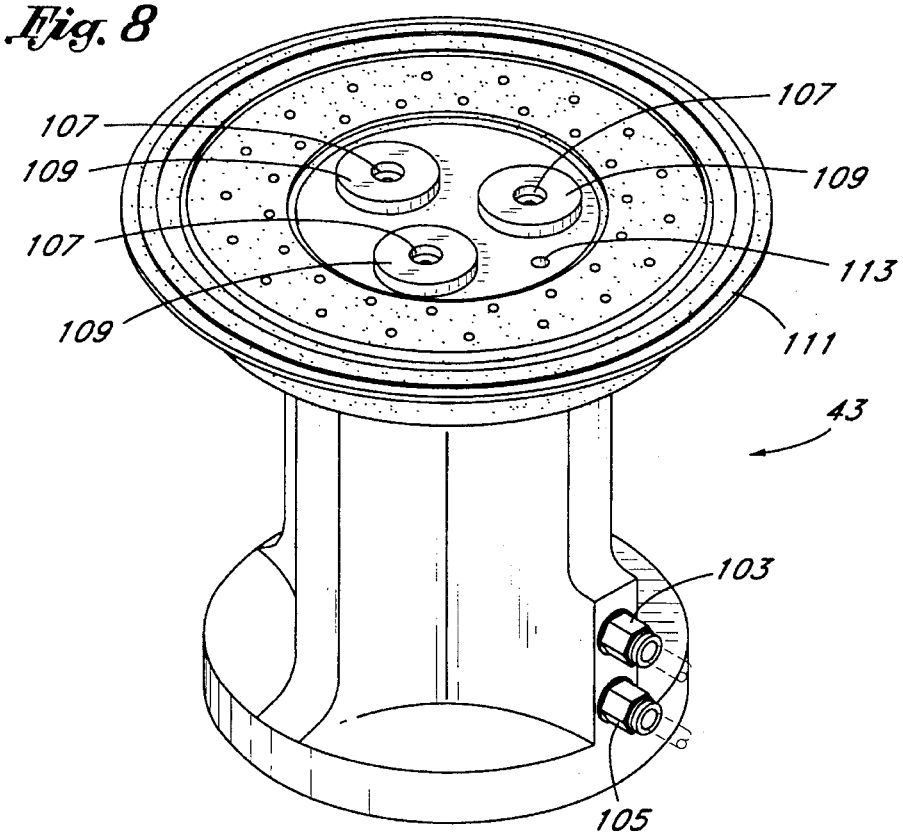
FIG. 8 is a perspective view of a support used with the hub connector of the present invention.

Referring to FIG. 8 a perspective view of the support 43 is shown. The support 43 shown has a pair of small connector at its side, including an upper connector 103 and a lower connector 105. The support 43 has a set of three elastomeric supports 107 each secured with a small hex screw 109. The elastomeric supports 107 are surrounded by a low profile suction cup 111, in this case having a plurality of circular raised structures formed in the elastomeric body of the suction cup 111.

A vacuum hole 113 is shown located adjacent the three elastomeric supports 107. Once the glass 41 rests on the suction cup 111, a vacuum is drawn through the vacuum hole 113 through the upper connector 103. When connected to the hub connector 51, the vacuum source for the support 43 comes from one of the upper connectors 91 which in turn comes from the upper feed connector 95. Upper feed connector 95 receives its source of vacuum from white header 21 through white tube 55.

Figure 9:
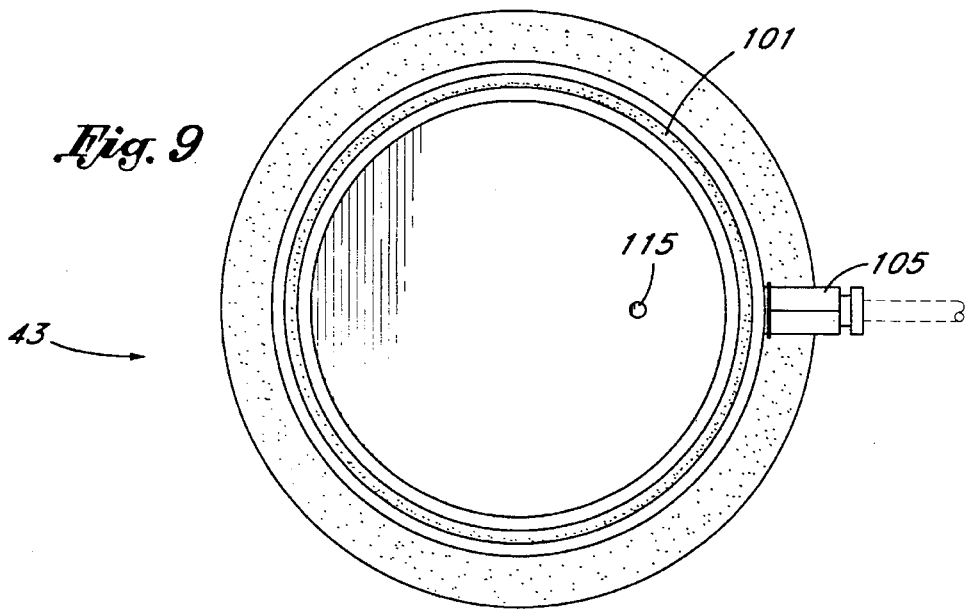
FIG. 9 is a bottom view of the support used with the hub connector of the present invention.

Referring to FIG. 9, a bottom view of the support 43 is illustrated. As shown, the support 43 has a vacuum aperture 115 which is offset from its center. As is also seen, a circular elastomeric sealing member 101 is shown extending about the bottom of support 43 near the outermost periphery.

While the present invention has been described in terms of a device and system used in the manufacture of glass objects, and in particular the milling, edging and machining of glass, one skilled in the art will realize that the structure and techniques of the present invention can be applied to many appliances. The present invention may be applied in any situation where manufacturing system components are sought to be rapidly and easily replaced with due consideration to safety, time, convenience, and simplification.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed is:

1. A positional device comprising:

a circular base having a first side and a second side;

a piston assembly located on said first side of said circular base which further comprises:

a piston housing;

a larger diameter piston axially displaceable outside of said piston housing;

a smaller diameter piston axially displaceable outside of said larger diameter piston and carrying a spacing ring about an upper end of said smaller diameter piston, and where said spacer ring has a larger diameter than said smaller diameter piston, and where said larger diameter piston accommodates said spacer ring when said smaller diameter piston is withdrawn within said larger diameter piston;

a vacuum fitting in fluid communication with a vacuum aperture on said second side of said circular base;

fluid fittings for operating and in fluid communication with said piston assembly.

2. The positional device recited in claim 1 wherein said second side of said positional device supports a continuous elastomeric seal which surrounds said vacuum aperture.

3. The positional device recited in claim 1 wherein said fluid fittings are supported by said piston assembly.

4. The positional device of claim 1 wherein said circular base also supports a pressure bleed valve which controls the fluid access to said second side of said circular base and said vacuum aperture.

5. The positional device of claim 1 wherein said piston assembly is acentrically located with respect to said circular base.

6. The positional device of claim 1 wherein said fluid fittings comprise at least two fluid fittings.

7. The positional device of claim 1 wherein said fluid fittings overlie, but do not extend beyond said circular base.

8. A positional device system, including the positional device recited in claim 1 and further comprising:

a horizontal table; and a vacuum pump system connected to and in fluid communication with said positional device.

9. The positional device system as recited in claim 8 wherein said vacuum pump system has a separate connection to said vacuum fitting of positional device and separate from a connection to said fluid fitting.

* * * * *